(12) United States Patent
Kida et al.

(10) Patent No.: US 9,223,366 B2
(45) Date of Patent: Dec. 29, 2015

(54) CALCULATING POWER CONSUMPTION FOR EACH APPLICATION EXECUTED BY AN ELECTRONIC APPARATUS

(71) Applicant: SONY CORPORATION, Tokyo (JP)

(72) Inventors: Takashi Kida, Tokyo (JP); Masahiro Tamori, Kanagawa (JP); Hiroki Nagahama, Tokyo (JP)

(73) Assignee: Sony Corporation, Tokyo (JP)

( * ) Notice: Subject to any disclaimer, the term of this patent is extended or adjusted under 35 U.S.C. 154(b) by 285 days.

(21) Appl. No.: 13/896,824

(22) Filed: May 17, 2013

(65) Prior Publication Data

US 2013/0332749 A1    Dec. 12, 2013

(30) Foreign Application Priority Data

Jun. 12, 2012  (JP) ................................. 2012-132558

(51) Int. Cl.
*G06F 1/26* (2006.01)
*G06F 1/20* (2006.01)
*G06F 1/32* (2006.01)

(52) U.S. Cl.
CPC  *G06F 1/26* (2013.01); *G06F 1/203* (2013.01); *G06F 1/206* (2013.01); *G06F 1/3206* (2013.01); *Y02B 60/1275* (2013.01)

(58) Field of Classification Search
CPC .................................................. G06F 1/3203
USPC ........................................................ 713/300
See application file for complete search history.

(56) References Cited

U.S. PATENT DOCUMENTS

| | | | |
|---|---|---|---|
| 7,028,211 B2* | 4/2006 | Mantani ......................... | 713/600 |
| 7,934,111 B2* | 4/2011 | Yamaji ........................... | 713/324 |
| 8,171,133 B2* | 5/2012 | Tanaka ........................... | 709/224 |
| 8,214,663 B2* | 7/2012 | Floyd et al. .................... | 713/300 |
| 2006/0031695 A1* | 2/2006 | Isozaki et al. .................. | 713/375 |
| 2006/0053316 A1* | 3/2006 | Yamazaki et al. ............. | 713/300 |
| 2009/0094472 A1* | 4/2009 | Lin .................................. | 713/324 |
| 2010/0057967 A1* | 3/2010 | Murakami et al. ............ | 710/264 |
| 2013/0198552 A1* | 8/2013 | Ponsford et al. ............... | 713/340 |

FOREIGN PATENT DOCUMENTS

JP     2010-244202     10/2010

* cited by examiner

*Primary Examiner* — Suresh Suryawanshi
(74) *Attorney, Agent, or Firm* — Paratus Law Group, PLLC (57) ABSTRACT

An electronic apparatus that includes a CPU and at least one device and that is identical to or different from an electronic apparatus in which the CPU is capable of simultaneously executing multiple applications. The electronic apparatus includes: a determiner that determines usage rates of the CPU and the device for each application being executed, on the basis of at least one of statistical information and log information of the CPU and the device; a divider that determines proportions of power consumptions of the CPU and the device relative to a power consumption of the entire electronic apparatus; and an estimator that estimates a proportion of a power consumption for each application relative to the power consumption of the entire electronic apparatus, on the basis of the determined usage rates and the determined proportions.

12 Claims, 6 Drawing Sheets

CALCULATING POWER CONSUMPTION FOR EACH APPLICATION EXECUTED BY AN ELECTRONIC APPARATUS

BACKGROUND

The present disclosure relates to an electronic apparatus, a calculation method, a program, and an information processing apparatus. More particularly, the present disclosure relates to an electronic apparatus, a calculation method, a program, and an information processing apparatus that are preferably used for calculating a power consumption for each application executed by an electronic apparatus.

Nowadays, an increase in efforts for minimizing the power consumption (the so-called "power saving") has been advocated in every field. Power saving involves determining the current power consumption.

That is, power saving involves individually measuring, as an overall home, power consumptions of home electrical appliances, such as an air conditioner, a refrigerator, and a television set placed in a house, and technology for the power-consumption measurement is available.

In addition, with respect to power consumption inside an individual electrical appliance, for example, technology for estimating power consumptions of devices included in a battery-powered electrical appliance as information for extending the drive time of the electronic apparatus is available (see, for example, Japanese Unexamined Patent Application Publication No. 2010-244202).

In addition, there is also a scheme for estimating power consumption of an application (hereinafter referred to as an "app") executed on an Android mobile terminal or the like on the basis of power consumption of each method on the Android mobile terminal.

SUMMARY

With the above-described scheme, however, the power consumption for only a single app that is being executed can be estimated, and the power consumptions for respective apps in a case in which the multiple apps are simultaneously executed are not estimated, the case being assumed to be a situation in which an electronic apparatus is actually used.

The present disclosure has been made in view of the foregoing situation and it is desired to make it possible to estimate the power consumptions of respective apps that can be simultaneously executed in an electronic apparatus.

According to a first embodiment of the present disclosure, there is provided an electronic apparatus that includes a CPU and at least one device and that is identical to or different from an electronic apparatus in which the CPU is capable of simultaneously executing multiple applications. The electronic apparatus includes: a determiner configured to determine usage rates of the CPU and the device for each application being executed, on the basis of at least one of statistical information and log information of the CPU and the device; a divider configured to determine proportions of power consumptions of the CPU and the device relative to a power consumption of the entire electronic apparatus; and an estimator configured to estimate a proportion of a power consumption for each application relative to the power consumption of the entire electronic apparatus, on the basis of the usage rates of the CPU and the device for each application, the usage rates being determined by the determiner, and the proportions of the power consumptions of the CPU and the device relative to the power consumption of the entire electronic apparatus, the proportions being determined by the divider.

The estimator can estimate a power consumption of an OS on the basis of the estimated proportion of the power consumption for each application relative to the power consumption of the entire electronic apparatus.

Without redundantly using the proportion of the power consumption of the device shared by the applications that are simultaneously executed, the estimator can estimate the proportion of the power consumption for each application relative to the power consumption of the entire electronic apparatus.

For determining, for each application, a usage rate of a delay device whose operation is likely to be delayed relative to an instruction from the application, the determiner can determine the usage rate on the basis of at least one of the statistical information or the log information.

The electronic apparatus according to the first embodiment of the present disclosure further includes a presenter configured to present, to a user, the estimated proportion of the power consumption for each application relative to the power consumption of the entire electronic apparatus or the power consumption for each application.

According to the first embodiment of the present disclosure, there is provided a method for calculating a power consumption in an electronic apparatus that includes a CPU and at least one device, the CPU being capable of simultaneously executing multiple applications. The electronic apparatus or an electronic apparatus that is different from the electronic apparatus performs: determining usage rates of the CPU and the device for each application being executed, on the basis of at least one of statistical information and log information of the CPU and the device; determining proportions of power consumptions of the CPU and the device relative to a power consumption of the entire electronic apparatus; and estimating a proportion of a power consumption for each application relative to the power consumption of the entire electronic apparatus, on the basis of the determined usage rates of the CPU and the device for each application and the determined proportions of the power consumptions of the CPU and the device relative to the power consumption of the entire electronic apparatus.

According to the first embodiment of the present disclosure, there is provided a program for an electronic apparatus that includes a CPU and at least one device and that is identical to or different from an electronic apparatus in which the CPU is capable of simultaneously executing multiple applications. The program causes the electronic apparatus to function as: a determiner configured to determine usage rates of the CPU and the device for each application being executed, on the basis of at least one of statistical information and log information of the CPU and the device; a divider configured to determine proportions of power consumptions of the CPU and the device relative to a power consumption of the entire electronic apparatus; and an estimator configured to estimate a proportion of a power consumption for each application relative to the power consumption of the entire electronic apparatus, on the basis of the usage rates of the CPU and the device for each application, the usage rates being determined by the determiner, and the proportions of the power consumptions of the CPU and the device relative to the power consumption of the entire electronic apparatus, the proportions being determined by the divider.

In the first embodiment of the present disclosure, usage rates of the CPU and the device for each application being executed are determined on the basis of at least one of statistical information and log information of the CPU and the device and proportions of power consumptions of the CPU and the device relative to a power consumption of the entire electronic apparatus are determined. A proportion of a power consumption for each application relative to the power consumption of the entire electronic apparatus is estimated on the basis of the determined usage rates of the CPU and the device for each application and the determined proportions of the power consumptions of the CPU and the device relative to the power consumption of the entire electronic apparatus.

According to a second embodiment of the present disclosure, there is provided an information processing apparatus that includes: a usage-rate obtainer configured to obtain, in an electronic apparatus that includes a CPU capable of simultaneously executing multiple applications and at least one device, usage rates of the CPU and the device for each application being executed in the electronic apparatus, the usage rates being determined on the basis of at least one of statistical information and log information of the CPU and the device; a proportion obtainer configured to obtain proportions of power consumptions of the CPU and the device relative to a power consumption of the entire electronic apparatus; and an estimator configured to estimate a proportion of a power consumption for each application relative to the power consumption of the entire electronic apparatus, on the basis of the usage rates of the CPU and the device for each application, the usage rates being obtained by the usage-rate obtainer, and the proportions of the power consumptions of the CPU and the device relative to the power consumption of the entire electronic apparatus, the proportions being obtained by the proportion obtainer.

In the second embodiment of the present disclosure, in an electronic apparatus that includes a CPU capable of simultaneously executing multiple applications and at least one device, usage rates of the CPU and the device for each application being executed in the electronic apparatus are obtained, the usage rates being determined on the basis of at least one of statistical information and log information of the CPU and the device. Proportions of power consumptions of the CPU and the device relative to a power consumption of the entire electronic apparatus are obtained. A proportion of a power consumption for each application relative to the power consumption of the entire electronic apparatus is determined on the basis of the obtained usage rates of the CPU and the device for each application and the obtained proportions of the power consumptions of the CPU and the device relative to the power consumption of the entire electronic apparatus.

According to the first embodiment of the present disclosure, it is possible to estimate power consumptions for respective apps that are simultaneously executed.

According to the second embodiment of the present disclosure, it is possible to estimate power consumptions for respective apps that are simultaneously executed in an electronic apparatus.

DETAILED DESCRIPTION OF EMBODIMENTS

Embodiments for carrying out the present disclosure will be described below in detail with reference to the accompanying drawings.

1. Embodiments

[Configuration Example of Electronic Apparatus]

Figure 1:
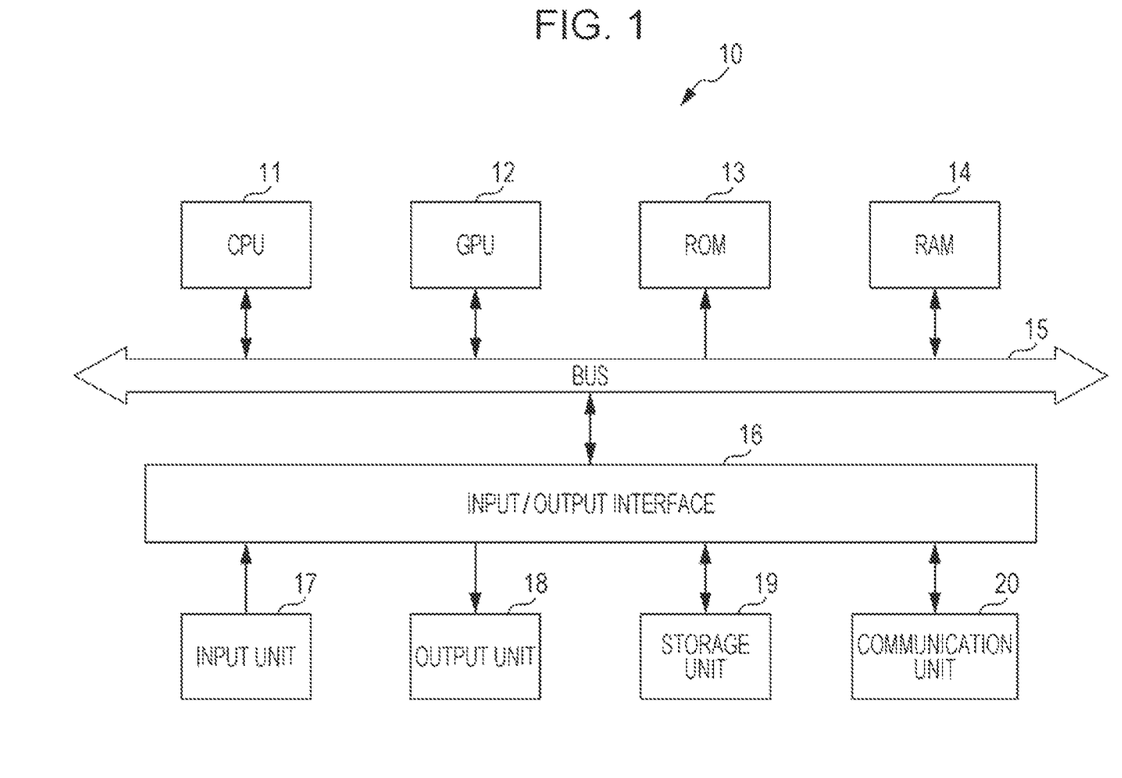
FIG. 1 is a block diagram illustrating a configuration example of an electronic apparatus according to an embodiment of the present disclosure.

FIG. 1 illustrates a configuration example of an electronic apparatus according to an embodiment of the present disclosure. An electronic apparatus 10 includes a central processing unit (CPU) 11, a graphics processing unit (GPU) 12, a read only memory (ROM) 13, and a random access memory (RAM) 14, which are interconnected through a bus 15.

An input/output interface 16 is further connected to the bus 15. An input unit 17, an output unit 18, a storage unit 19, and a communication unit 20 are connected to the input/output interface 16.

The input unit 17 includes various keys, a touch panel, a microphone, and so on. The output unit 18 includes a display, a speaker, and so on. The storage unit 19 includes a hard disk, a nonvolatile memory, and so on. The communication unit 20 performs wireless communication, such as 3G communication (data communication using a mobile phone network), Wi-Fi communication, and Bluetooth communication, and also connects to a universal serial bus (USB) equipment and so on.

Although the electronic apparatus 10 may be implemented by, for example, a tablet or notebook personal computer, a smartphone, or a mobile phone, the application of the present disclosure is not limited thereto.

In the electronic apparatus 10 configured as described above, apps for various purposes are stored in the storage unit 19. The CPU 11 executes an operating system (OS), loads any of the apps into the RAM 14 through the input/output interface 16 and the bus 15, and then executes the app to thereby realize various functions.

In the electronic apparatus 10, the CPU 11 executes a program for app-specific power consumption determination processing to thereby realize a functional block corresponding to the program.

[Functional Block for Program for App-Specific Power Consumption Determination Processing]

Figure 2:
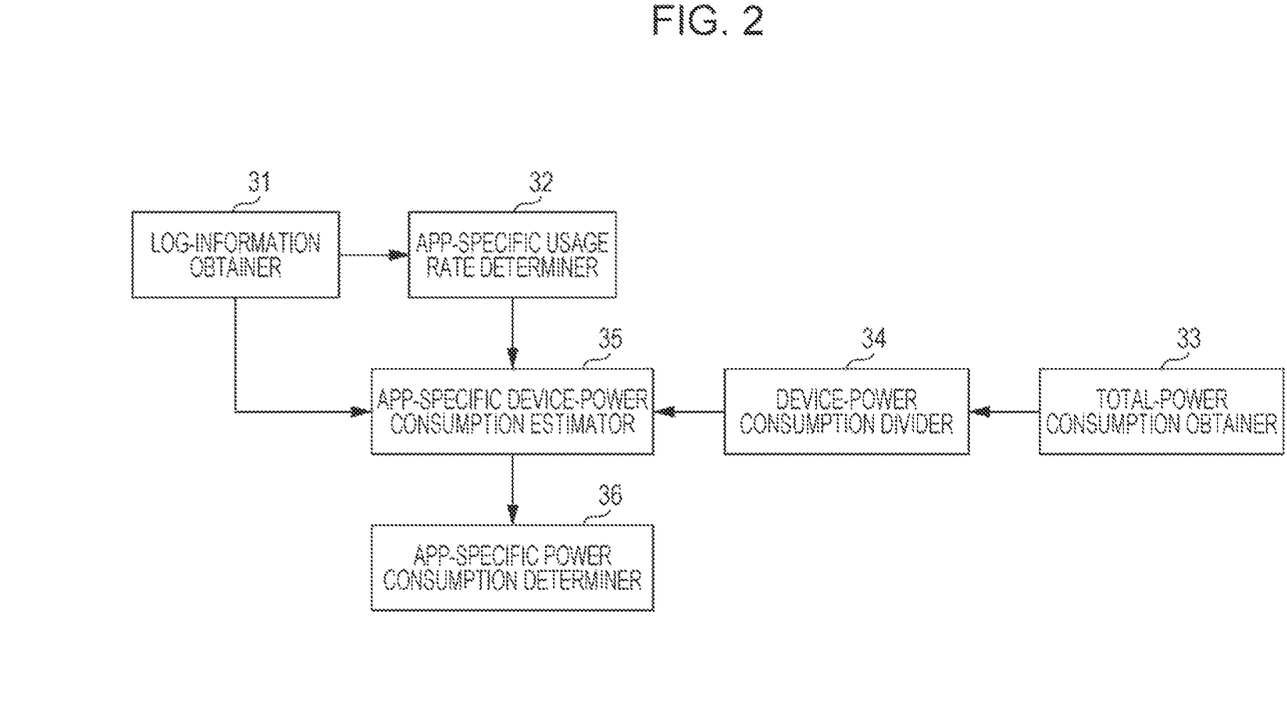
FIG. 2 is a block diagram illustrating a configuration example of a functional block realized by a CPU.

FIG. 2 shows a configuration example of a functional block of a program for app-specific power consumption determination processing.

A log-information obtainer 31 obtains statistical information and log information of the CPU 11 and other units included in the electronic apparatus 10. More specifically, the log-information obtainer 31 obtains a CPU usage rate of a process associated with each app with respect to the CPU 11, a memory usage amount associated with each app with respect to the RAM 14, input/output statistical information of a process associated with each app with respect to the storage unit 19, a packet transmission/reception amount of a process associated each app with respect to the communication unit 20, and so on.

On the basis of the statistical information and the log information obtained by the log-information obtainer 31, an app-specific usage rate determiner 32 determines the usage rates of the CPU 11 and the other units for each app in a predetermined sampling period.

A total-power consumption obtainer 33 obtains the power consumption of the entire electronic apparatus 10. More specifically, the power consumption may be actually measured using hardware or may also be estimated using a predetermined computational operation. A device-power consumption divider 34 determines proportions of the power consumptions of the CPU 11 and the other units relative to the power consumption of the entire electronic apparatus 10. The proportions may also be actually measured using hardware or may also be estimated using a predetermined computational operation.

On the basis of the usage rates of the CPU 11 and the other units for each app and the proportions of the power consumptions by the CPU 11 and the other units, an app-specific device-power consumption estimator 35 estimates a proportion of the power consumption of each device or the like used for each app relative to the power consumption of the entire electronic apparatus 10. An app-specific power consumption determiner 36 determines a power consumption for each app on the basis of the proportions of the power consumptions of the respective devices used for each app relative to the power consumption of the entire electronic apparatus 10.

[Operation]

Next, a specific procedure of the app-specific power consumption determination processing will be described with reference to FIGS. 3 and 4.

Figure 3:
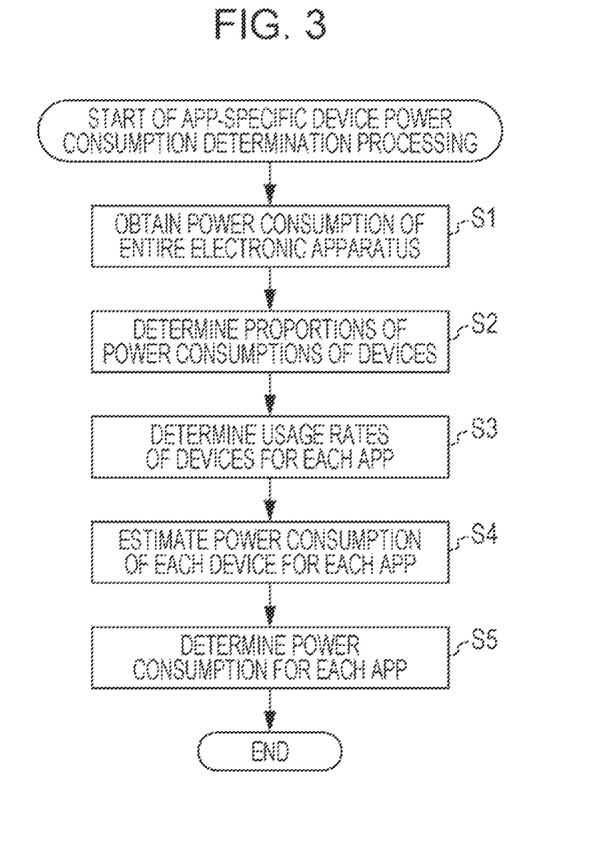
FIG. 3 is a flowchart illustrating app-specific power consumption determination processing.
Figure 4:
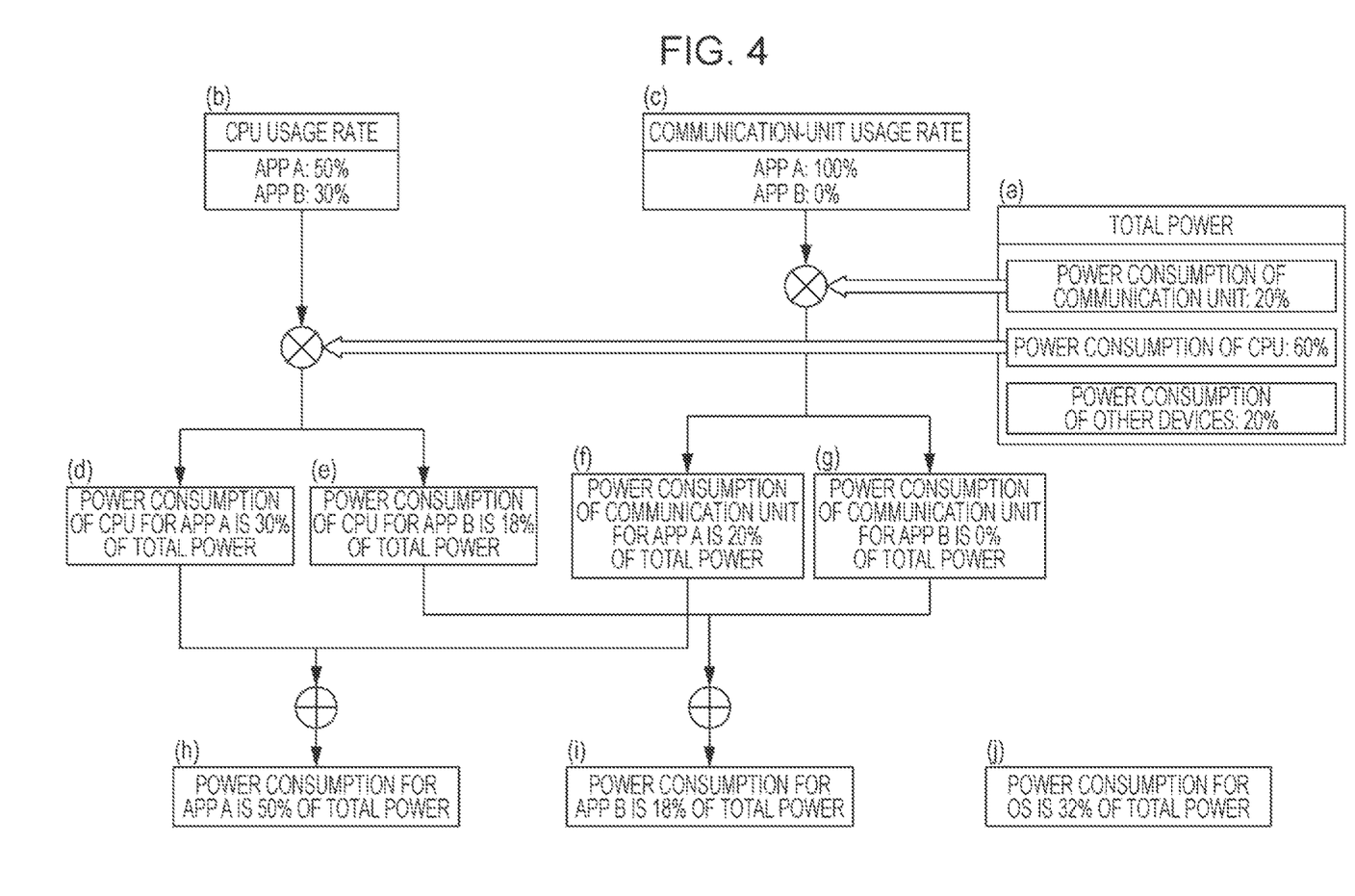
FIG. 4 is a diagram illustrating a calculation example in the app-specific power consumption determination processing.

FIG. 3 is a flowchart illustrating the app-specific power consumption determination processing and FIG. 4 illustrates a calculation example in the app-specific power consumption determination processing when two types of app, i.e., app A and app B, are simultaneously executed (this example includes time division processing).

As a premise for the app-specific power consumption determination processing, the log-information obtainer 31 obtains the statistical information and log information of the CPU 11 and the other units included in the electronic apparatus 10. Hereinafter, the CPU 11 and the other units may also be referred to as "devices".

In step S1, a total-power consumption obtainer 33 obtains the power consumption of the entire electronic apparatus 10. The calculation example illustrated in FIG. 4 will be described below in conjunction with an example in which the power consumption of the entire electronic apparatus 10 is assumed to be X.

In step S2, the device-power consumption divider 34 determines proportions of the power consumptions of the respective devices relative to the power consumption X of the entire electronic apparatus 10. In the calculation example illustrated in FIG. 4, as shown at (a), the proportion of the power consumption of the communication unit 20 is 20%, the proportion of the power consumption of the CPU 11 is 60%, and the proportion of the power consumption of the other devices is 20%.

In step S3, the app-specific usage rate determiner 32 determines usage rates of the respective devices for each app, on the basis of the statistical information and the log information obtained by the log-information obtainer 31. In the calculation example in FIG. 4, as shown at (b), the usage rate of the CPU 11 for app A is determined to be 50% and the usage rate of the CPU 11 for app B is determined to be 30%. As shown at (c), the usage rate of the communication unit 20 for app A is determined to be 100% and the usage rate of the communication unit 20 for app B is determined to be 0%.

In step S4, the app-specific device-power consumption estimator 35 estimates a proportion of the power consumption of each device used for each app relative to the power consumption X of the entire electronic apparatus 10 by multiplying the usage rate of each device for each app by the proportion of the power consumption of each device relative to the power consumption X of the entire electronic apparatus 10.

In the calculation example in FIG. 4, as shown at (d), the usage rate "50%" of the CPU 11 for app A is multiplied by the proportion "60%" of the power consumption of the CPU 11, so that the proportion of the power consumption of the CPU 11 for app A is estimated to be 30%. In addition, as shown at (e), the usage rate "30%" of the CPU 11 for app B is multiplied by the proportion "60%" of the power consumption of the CPU 11, so that the proportion of the power consumption of the CPU 11 for app B is estimated to be 18%. In addition, as shown at (f), the usage rate "100%" of the communication unit 20 for app A is multiplied by the proportion "20%" of the power consumption of the communication unit 20, so that the proportion of the power consumption of the communication unit 20 for app A is estimated to be 20%. In addition, as shown at (g), the usage rate "0%" of the communication unit 20 for app B is multiplied by the proportion "20%" of the power consumption of the communication unit 20, so that the proportion of the power consumption of the communication unit 20 for app B is estimated to be 0%.

In step S5, the app-specific power consumption determiner 36 determines a power consumption for each app on the basis of the proportion of the power consumption of each device used for each app relative to the power consumption X of the entire electronic apparatus 10.

In the calculation example in FIG. 4, as shown at (h), the proportion "30%" of the power consumption of the CPU 11 for app A and the proportion "20%" of the power consumption of the communication unit 20 for app A are added together, and 50%, which is the sum resulting from the addition, is multiplexed by the power consumption X of the entire electronic apparatus 10, to thereby determine a power consumption of 0.5X for app A. As illustrated at (i), the proportion "18%" of the power consumption of the CPU 11 for app B and the proportion "0%" of the power consumption of the communication unit 20 for app B are added together, and, 18%, which is the sum resulting from the addition, is multiplexed by the entire power consumption X of the electronic apparatus 10, to thereby determine a power consumption of 0.18X for app A.

As shown at (j), 32%, which is a remainder obtained by subtracting the proportion "50%" of the power consumption for app A and the proportion 18% of the power consumption for app B from the total power consumption "100%", is estimated to be a power consumption for the OS and so on other than app A and app B. Thus, the power consumption for the OS and so on is determined to be 0.32X.

The app-specific power consumption determination processing has been described thus far.

For example, when an app controls the storage unit 19 serving as a block device included in the electronic apparatus 10, the communication unit 20 serving as a network device, and the RAM 14 that performs direct memory access (DMA) transfer, these devices execute processing operations at once. Thus, a delay occurs from when a system call (command) is received from an app until the processing operations are actually started. In such a case, the app-specific usage rate determiner 32 performs delay handling processing described below so as to determine the usage rates of the devices for each app.

The determined power consumption for each app and so on can be presented to the user, for example, via a display included in the output unit 18.

[Delay Handling Processing]

Figure 5:
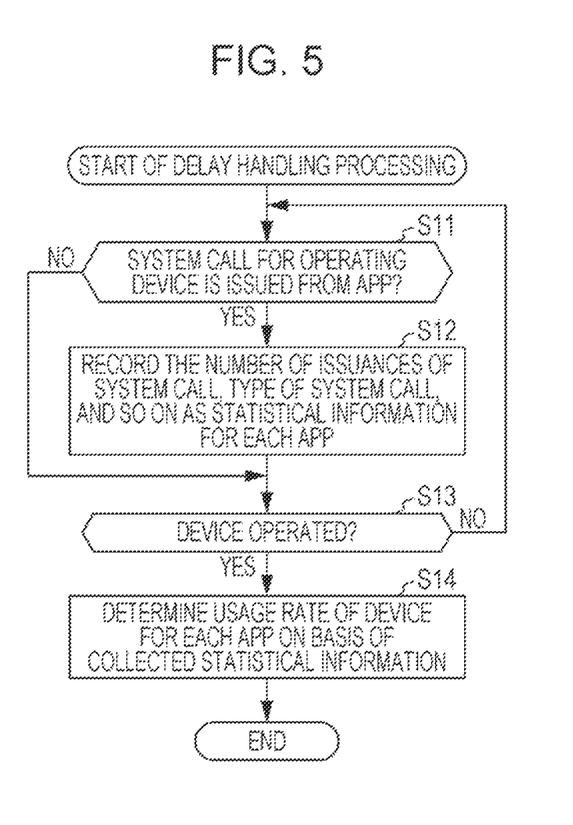
FIG. 5 is a flowchart illustrating delay handling processing.

FIG. 5 is a flowchart illustrating delay handling processing.

In step S11, the app-specific usage rate determiner 32 determines whether or not a system call for operating a device (hereinafter referred to as a "delay device") whose operation is likely to be delayed is issued from an app that is being executed. When it is determined that a system call is issued, the process proceeds to step S12 in which the number of issuances of the system call for the delay device, the type of the system call, and the transfer data amount are recorded as statistical information for each app. When it is determined in step S11 that no system call is issued, the processing in step S12 is skipped.

In step S13, the app-specific usage rate determiner 32 determines whether or not the delay device is operated, and returns the process to step S11 until it is determined that the delay device is operated. When it is determined that the relay device is operated, the process proceeds to step S14. In step S14, the app-specific usage rate determiner 32 determines a usage rate of the device for each app on the basis of the statistical information recorded up to this point.

For example, when app A issues a 10 MB write instruction to the storage unit 19 serving as a block device and app B also issues a 30 MB write instruction to the storage unit 19, the amounts of written data for apps A and B are recorded as statistical information. Then, after the storage unit 19 writes data of 40 MB, the usage rate of the storage unit 19 for app A is determined to be 25% (=10/40) and the usage rate of the storage unit 19 for app B is determined to be 75% (=30/40), on the basis of the recorded statistical information.

As described above, according to the delay handling processing, when the delay device operates, the usage rate of the delay device for each app is determined on the basis of the statistical information recorded up to this point. Thus, the usage rate of the delay device for each app can be determined more accurately.

As described above, the electronic apparatus 10 according to the present embodiment can determine the power consumptions for each app. When the power consumption for each app is presented to the user, it is possible to expect an advantage of causing the user to refrain from using an app that has a large power consumption.

The use of the power consumption for each app at an app development stage can contribute to power saving of the entire system, for example, when an app developer modifies an app having a large power consumption or adjusts an operation of the system so that apps having large power consumptions do not operate simultaneously. In addition, through use of an integrated development environment or a debugging tool, information obtained by adding time information to power consumption information for each app may be displayed simultaneously with the source code of the app, thereby making it possible to check at which part in the source code the power consumption increases.

The power consumption for each app is also useful to cause the system (the entire electronic apparatus 10) to perform a power-saving operation. For example, this technology is applicable to a case in which, when the maximum power consumption of the system is predetermined, multiple apps are selected and simultaneously executed so that the maximum power consumption is not exceeded. When it is desired to operate a battery-equipped system for a predetermined amount of time, the power consumption for each app can be utilized as an input to determine how long and which app is to be operated.

When determining the usage rates of the devices for each app operating in the system and the proportions of the power consumptions of the respective devices, the electronic apparatus 10 can estimate a power consumption of any app. That is, this technology has an advantage in that no processing may be performed each time software is modified in accordance with an app or each time an app is installed to the system. In addition, this technology makes it possible to easily check the power consumption even when the app is updated.

When multiple apps are simultaneously operated in the electronic apparatus 10, the power consumption for each app does not, in many cases, have a value obtained by simply summing up power consumptions when the apps are operated independently. For example, when two types of app, namely, app A and app B, continuously use the communication unit 20, it is sufficient for one of apps A and B to perform initialization processing and the other app does not have to perform initialization processing. When the power consumption for app A and the power consumption for app B are simply summed up, the power consumption for the corresponding initialization processing is redundantly calculated. However, since the electronic apparatus 10 does not perform simple summation, it is possible to accurately estimate the power consumption for each app.

Figure 6A:
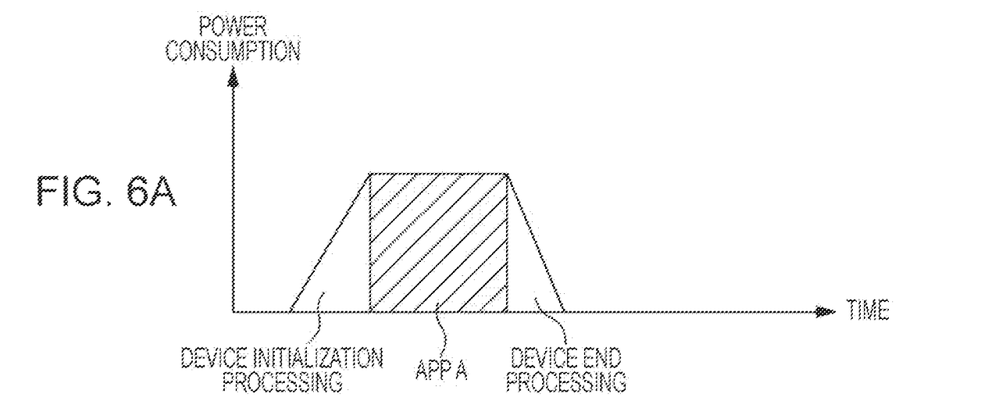
FIGS. 6A to 6C each illustrate power consumption when multiple apps are simultaneously executed.
Figure 6B:
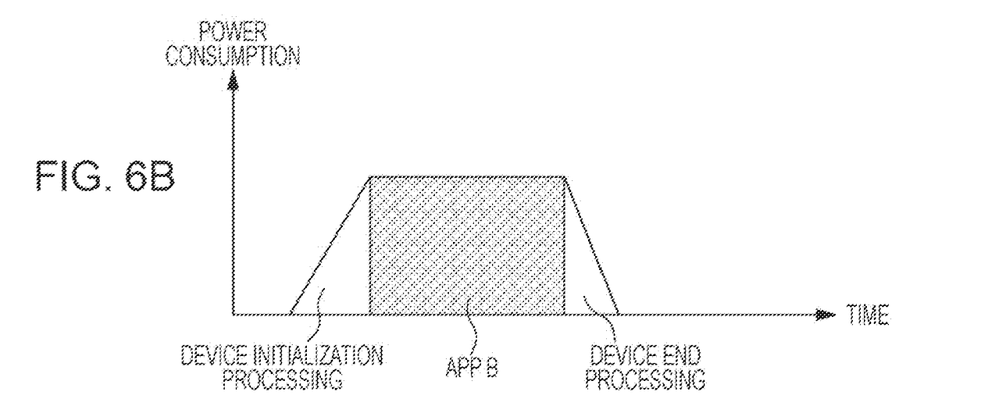
Figure 6C:
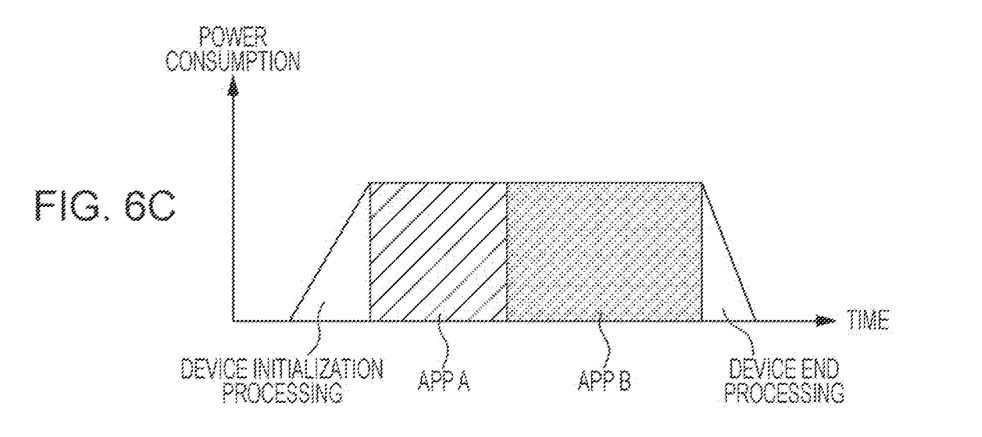

A more specific description will be given with reference to FIGS. 6A to 6C. FIG. 6A shows transition of a power consumption when app A independently operates a device. Similarly, FIG. 6B shows transition of a power consumption when app B independently operates the same device as the device for app A. FIG. 6C shows transition of a power consumption when app A and app B simultaneously operate a device (in a time division manner).

As illustrated in FIG. 6C, since each of the initialization processing and the end processing of the device is executed once, and thus, when the power consumption of the initialization processing and the end processing is redundantly added, error occurs in a result of the estimation. However, in the present embodiment, since the usage rate of the device for each app and the proportion of the power consumption of the device are determined and a power consumption is estimated on the basis of the usage rate and the proportion, a power consumption for each app can be estimated more accurately.

The power consumption estimated for each app may also be used to determine heat generated during execution of the app. This makes it possible to simplify thermal design for a case in which an entire system or specific app operates.

When the power consumption for each app is known during execution of multiple apps, it is possible to easily determine which app is to be selected as an app whose power consumption is to be reduced and which apps may be simultaneously operated in order to reduce the power consumption of the entire system.

Thus, when the power consumption of the entire system can be reduced, heat generated can be reduced. Thus, it is possible to reduce the amount of noise without providing a cooling fan in the electronic apparatus 10 and it is also possible to reduce a housing space without providing a heatsink.

The power consumption for an app may be recorded after operation thereof and a proposal may be made to the user so as shift the time for operating an app (e.g., a moving-picture-format converting app) having a large power consumption to later night hours when the electricity charge is low. With such an arrangement, the user can reduce the electricity charge.

In the present embodiment, the electronic apparatus 10 that can simultaneously execute multiple apps has been described as having all of the functional blocks illustrated in FIG. 2. However, all or some of the functional blocks in FIG. 2 may also be applied to another electronic apparatus or information processing apparatus.

The present disclosure is not limited to the above-described embodiment and various changes and modifications are possible without departing from the spirit of the present disclosure.

The present disclosure contains subject matter related to that disclosed in Japanese Priority Patent Application JP 2012-132558 filed in the Japan Patent Office on Jun. 12, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus that includes a central processing unit and at least one device and that is identical to or different from an electronic apparatus in which the central processing unit is capable of simultaneously executing multiple applications, the electronic apparatus comprising:
   a determiner configured to determine usage rates of the central processing unit and the device for each application being executed, on the basis of at least one of statistical information and log information of the central processing unit and the device;
   a divider configured to determine proportions of power consumptions of the central processing unit and the device relative to a power consumption of the entire electronic apparatus; and
   an estimator configured to estimate a proportion of a power consumption for each application relative to the power consumption of the entire electronic apparatus, on the basis of the usage rates of the central processing unit and the device for each application, the usage rates being determined by the determiner, and the proportions of the power consumptions of the central processing unit and the device relative to the power consumption of the entire electronic apparatus, the proportions being determined by the divider.

2. The electronic apparatus according to claim 1, wherein the estimator estimates a power consumption of an operating system on the basis of the estimated proportion of the power consumption for each application relative to the power consumption of the entire electronic apparatus.

3. The electronic apparatus according to claim 2, wherein, without redundantly using the proportion of the power consumption of the device shared by the applications that are simultaneously executed, the estimator estimates the proportion of the power consumption for each application relative to the power consumption of the entire electronic apparatus.

4. The electronic apparatus according to claim 2, wherein, for determining, for each application, a usage rate of a delay device whose operation is likely to be delayed relative to an instruction from the application, the determiner determines the usage rate on the basis of at least one of the statistical information or the log information.

5. The electronic apparatus according to claim 2, further comprising:
   a presenter configured to present, to a user, the estimated proportion of the power consumption for each application relative to the power consumption of the entire electronic apparatus or the power consumption for each application.

6. A method for calculating a power consumption in an electronic apparatus that includes a central processing unit and at least one device, the central processing unit being capable of simultaneously executing multiple applications, the electronic apparatus or an electronic apparatus that is different from the electronic apparatus performing:
   determining usage rates of the central processing unit and the device for each application being executed, on the basis of at least one of statistical information and log information of the central processing unit and the device;
   determining proportions of power consumptions of the central processing unit and the device relative to a power consumption of the entire electronic apparatus; and
   estimating a proportion of a power consumption for each application relative to the power consumption of the entire electronic apparatus, on the basis of the determined usage rates of the central processing unit and the device for each application and the determined proportions of the power consumptions of the central processing unit and the device relative to the power consumption of the entire electronic apparatus.

7. A non-transitory computer-readable medium having embodied thereon a program, which when executed by an electronic apparatus that includes a central processing unit and at least one device and that is identical to or different from an electronic apparatus in which the central processing unit is capable of simultaneously executing multiple applications, the program causing the electronic apparatus to execute a method, the method comprising:
   determining usage rates of the central processing unit and the device for each application being executed, on the basis of at least one of statistical information and log information of the central processing unit and the device;
   determining proportions of power consumptions of the central processing unit and the device relative to a power consumption of the entire electronic apparatus; and
   estimating a proportion of a power consumption for each application relative to the power consumption of the entire electronic apparatus, on the basis of the determined usage rates of the central processing unit and the device for each application and the determined proportions of the power consumptions of the central processing unit and the device relative to the power consumption of the entire electronic apparatus.

8. An information processing apparatus comprising:
   a usage-rate obtainer configured to obtain, in an electronic apparatus that includes a central processing unit capable of simultaneously executing multiple applications and at least one device, usage rates of the central processing unit and the device for each application being executed in the electronic apparatus, the usage rates being determined on the basis of at least one of statistical information and log information of the central processing unit and the device;
   a proportion obtainer configured to obtain proportions of power consumptions of the central processing unit and the device relative to a power consumption of the entire electronic apparatus; and
   an estimator configured to estimate a proportion of a power consumption for each application relative to the power consumption of the entire electronic apparatus, on the basis of the usage rates of the central processing unit and the device for each application, the usage rates being obtained by the usage-rate obtainer, and the proportions of the power consumptions of the central processing unit and the device relative to the power consumption of the entire electronic apparatus, the proportions being obtained by the proportion obtainer.

9. The method according to claim 6, further comprising performing an estimation of a power consumption of an operating system on the basis of the estimated proportion of the power consumption for each application relative to the power consumption of the entire electronic apparatus.

10. The method according to claim 9, wherein, without redundantly using the proportion of the power consumption of the device shared by the applications that are simultaneously executed, the proportion of the power consumption for each application is estimated relative to the power consumption of the entire electronic apparatus.

11. The method according to claim 9, wherein, for determining, for each application, a usage rate of a delay device whose operation is likely to be delayed relative to an instruction from the application, the usage rate is determined on the basis of at least one of the statistical information or the log information.

12. The method according to claim 9, further comprising performing:
    presenting, to a user, the estimated proportion of the power consumption for each application relative to the power consumption of the entire electronic apparatus or the power consumption for each application.

* * * * *